United States Patent

Girardeau et al.

Patent Number: 6,161,014
Date of Patent: Dec. 12, 2000

[54] METHOD OF HANDLING OVER A CALL BETWEEN TWO RELAY STATIONS OF A CELL OF A DIGITAL CELLULAR MOBILE RADIO SYSTEM

[75] Inventors: Laurent Girardeau, Cergy le Haut; Corinne Cherpantier, Rueil Malmaison, both of France

[73] Assignee: Alcatel, Paris, France

[21] Appl. No.: 09/303,569

[22] Filed: May 3, 1999

[30] Foreign Application Priority Data

May 4, 1998 [FR] France .................................. 98 05611

[51] Int. Cl.⁷ .............................. H04Q 7/38; H04Q 7/22
[52] U.S. Cl. .......................... 455/436; 455/442; 455/444; 455/450; 370/331
[58] Field of Search .................................... 445/436, 439, 445/442, 444, 450, 7, 13.1, 67.1, 67.4, 11.1; 370/331, 332

[56] References Cited

U.S. PATENT DOCUMENTS

| | | | |
|---|---|---|---|
| 5,408,514 | 4/1995 | Sakamoto et al. | 455/439 |
| 5,729,539 | 3/1998 | Heeschen et al. | 370/332 |
| 5,805,633 | 9/1998 | Uddenfeldt | 370/330 |
| 5,894,472 | 4/1999 | De Seze | 370/337 |
| 5,898,679 | 4/1999 | Brederveld et al. | 455/11.1 |
| 5,907,540 | 5/1999 | Hayashi | 455/11.1 |
| 5,915,219 | 6/1999 | Poyhonen | 455/436 |
| 5,937,019 | 8/1999 | Padovani | 455/439 |
| 5,956,641 | 9/1999 | Bruckert et al. | 455/436 |
| 5,991,282 | 11/1999 | Langlet et al. | 370/332 |

FOREIGN PATENT DOCUMENTS 0 479 255 A2  4/1992  European Pat. Off. .
WO 98/18281  4/1998  WIPO .

*Primary Examiner*—Lee Nguyen
*Assistant Examiner*—Simon Nguyen
*Attorney, Agent, or Firm*—Sughrue, Mion, Zinn, Macpeak & Seas, PLLC

[57] ABSTRACT

A method is described of handing over calls between two relay stations, respectively a current relay station and a target relay station in the same cell of a digital cellular mobile radio system, the cell being associated with a base transceiver station comprising a plurality of relay stations including the current and target relay stations and geographically distributed within the cell. Each relay station comprises at least one antenna connected to at least one transmit/receive device. Each relay station has a plurality of traffic channels and a plurality of associated signaling channels. A call being set up for a mobile station is allocated, from the channels of the current relay station, at least one current traffic channel and at least one current associated signaling channel. The plurality of relay stations shares at least one particular traffic channel, constituting a shared traffic channel, which is reserved at least partly for handover. The method includes a first handover phase in which the shared traffic channel is a first target traffic channel. The first phase includes the following successive steps: sending by the mobile station of at least one test message to the plurality of relay stations via the shared traffic channel, and selection by the system of the target relay station from the plurality of relay stations, in accordance with at least one predetermined selection criterion based on at least one parameter associated with the quality of reception of the at least one test message. The method also includes a second handover phase with a traffic channel associated with the target relay station as a second target traffic channel.

10 Claims, 4 Drawing Sheets

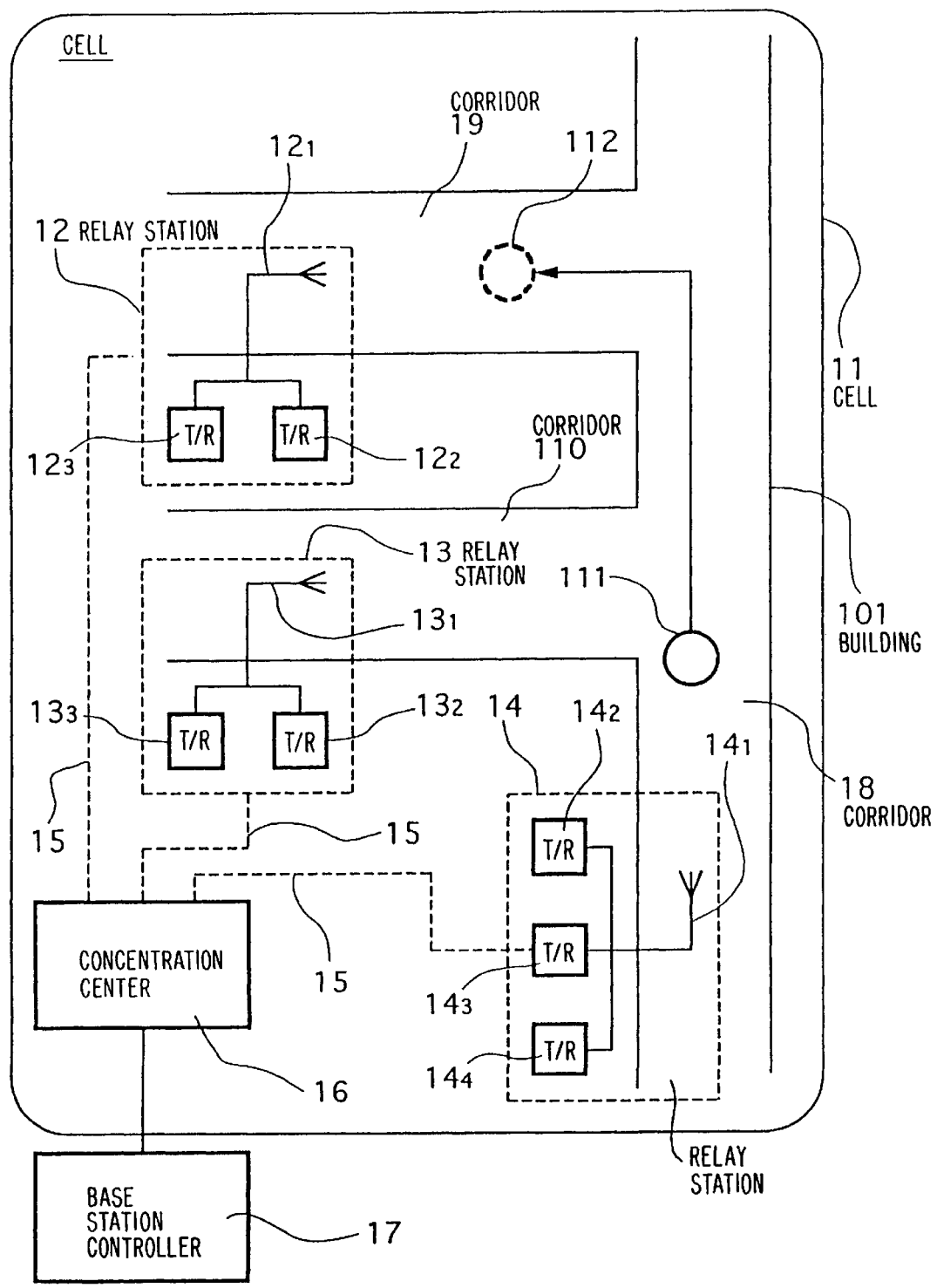

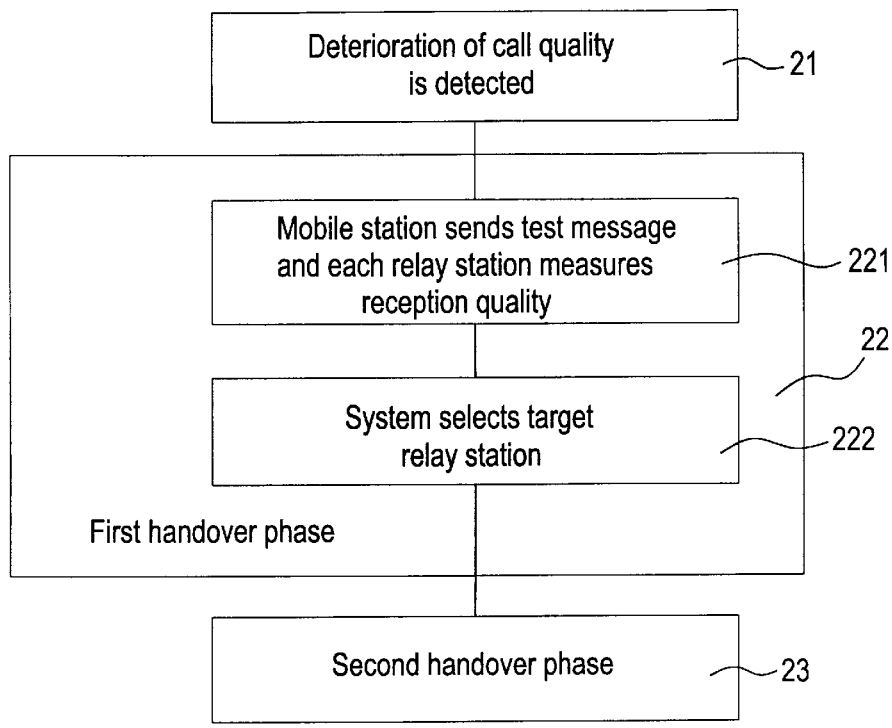
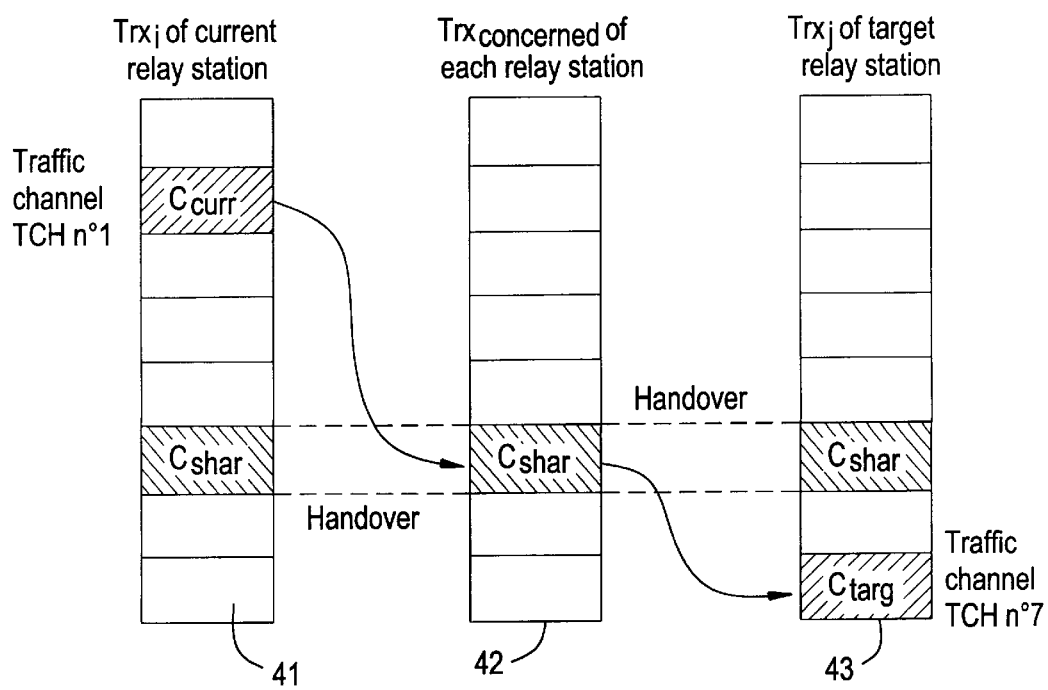

METHOD OF HANDLING OVER A CALL BETWEEN TWO RELAY STATIONS OF A CELL OF A DIGITAL CELLULAR MOBILE RADIO SYSTEM

BACKGROUND OF THE INVENTION

Field of the Invention

The field of the invention is that of digital mobile radio systems. The invention applies in particular, although not exclusively, to cellular systems to the GSM 900 standard (Global System for Mobile Communications in the 900 MHz band), the DCS 1800 standard (Digital Cellular System, 1800 MHz) or the PCS standard (Personal Communication System).

To be more precise, the invention concerns call handover between two relay stations of a cell of a digital cellular mobile radio system.

Conventionally, a cell is associated with a base transceiver station. The base transceiver station uses a signaling carrier specific to it and which supports a broadcast control channel (BCCH). A mobile station in the cell communicates with the system via the base transceiver station. This communication uses a traffic carrier allocated by the base transceiver station. The information corresponding to this allocation is transmitted on the signaling carrier.

Conventionally, each carrier is time-shared, using the time-division multiple access (TDMA) technique. This divides the time axis into successive frames of predetermined duration. Each frame is in turn divided into a particular number of time slots. The recurrence of a particular time slot in each frame corresponds to a physical channel onto which a number of logical channels can be multiplexed.

A mobile station communicates via a traffic channel (TCH), different from those allocated to other mobile stations in the same cell, and receives information concerning the system via at least one signaling channel associated with that traffic channel.

The invention applies to cells in which the base transceiver station uses a plurality of relay stations geographically distributed within the cell. Each relay station includes an antenna. Each antenna is associated with at least one transmit/receive device (or TRX, to use the GSM terminology). Each transmit/receive device includes a downlink traffic channel carrier transmitter and an uplink traffic channel carrier receiver.

The relay stations, and therefore the antennas, are geographically distributed within the associated cell to provide improved coverage and/or to handle a greater density of calls. The various relay stations are associated with a common signaling carrier. To this end, at least some of the relay stations include a downlink signaling channel carrier transmitter and an uplink signaling channel carrier receiver.

All the relay stations can be connected to the next higher level in the hierarchy (which is a base station controller (BSC) in the GSM) via a concentration center. In one implementation, the BSC provides the concentration functions directly and in this case the relay stations are connected directly to the BSC.

The problem arises of handing over calls between two relay stations of the cell. "Conventional" handover is operative between the base stations of two different cells. This "conventional" process is as follows: each base transceiver station transmits its own signaling carrier. The mobile station measures the signaling carriers of adjoining cells continuously. The results of such measurements are regularly transmitted via the current base transceiver station to the base station controller, which decides whether there is an opportunity for handover. When a call must be handed over, the controller decides the target base transceiver station and allocates a target traffic channel therein to the mobile station. This allocation is transmitted to the mobile station so that it can switch from the current traffic channel to the target traffic channel.

Consideration has been given to transposing this "conventional" handover between base stations to handover between relay stations of the same base station (which is no longer "conventional"), by simply substituting the relay station for the base station.

Unfortunately, such transposition is not easy, even impossible. In other words, the "conventional" handover process cannot be easily implemented with the distributed base transceiver station configuration (i.e. one comprising a plurality of relay stations) to which the present invention applies.

Each relay station does not transmit a signal that is specific to it (and therefore enables it to be identified). Consequently, the mobile station is not in a position to communicate with the measurement system enabling the latter to decide whether there is an opportunity for handover, or, for even stronger reasons, to determine the best target relay station to which the call should be handed over.

One objective of the invention is to overcome this major drawback of the prior art.

To be more precise, one objective of the present invention is to provide a method of handing over calls between two relay stations of the same cell of a mobile radio system that is simple and inexpensive.

Another objective of the invention is to provide a method of the above kind which optimizes the use of resources.

Another objective is to provide a method of the above kind that does not require any additional hardware to be developed, either for the mobile stations or for the system.

Another objective is to provide a method of the above kind which limits the number of handovers between relay stations required to obtain a predetermined reception quality.

SUMMARY OF THE INVENTION

The above objectives, together with others that will become apparent hereinafter, are achieved in accordance with the invention by a method of handing over calls between two relay stations, respectively a current relay station and a target relay station, in the same cell of a digital cellular mobile radio system, the cell being associated with a base transceiver station comprising plurality of relay stations, including the current and target relay stations, geographically distributed within the cell, each relay station comprising at least one antenna connected to at least one transmit/receive device, each relay station having a plurality of traffic channels and a plurality of associated signaling channels, the call being set up for a mobile station and being allocated, from the channels of the current relay station, at least one current traffic channel and at least one current associated signaling channel, wherein the plurality of relay stations shares at least one particular traffic channel, namely a shared traffic channel, which is reserved at least partly for handover, and wherein the method includes a first handover phase in which the shared traffic channel is a first target traffic channel and a second handover phase with a traffic channel associated with the target relay station as a second target traffic channel, the first phase including the following successive steps: sending by the mobile station of at least one test message to the plurality of relay stations via the shared traffic channel, and selection by the system of the target relay station from the plurality of relay stations, in accordance with at least one predetermined selection criterion based on at least one parameter associated with the quality of reception of the at least one test message.

The general principle of the invention is therefore based on the introduction of an intermediate shared traffic channel into the process of handing over a call from a current relay station to a target relay station, its use being interleaved in time between that of the current traffic channel and that of the target traffic channel. In other words, the method of the invention is similar to a double handover mechanism which successively performs a first handover from the current traffic channel to the shared traffic channel and a second handover from the shared traffic channel to the target traffic channel.

It is noteworthy that the mobile station can send test messages via the shared traffic channel, comprising one or more traffic messages to the various relay stations of the cell and a specific message such as the GSM "Handover-Access" message.

No additional hardware development is necessary, either for the mobile stations or for the equipment of the system itself.

Accordingly, the method of the invention selects the target relay station that is best receiving the mobile station. In the "conventional" procedure previously referred to, the base station that is received best by the mobile station is selected. The fact that it is the relay station (and no longer the mobile station) that performs the measurement, by virtue of the shared traffic channel, eliminates the problem of no transmission by each relay station of a specific signal (and therefore the impossibility of selecting the target relay station by simply listening to the signals transmitted by the various relay stations).

Clearly, in the current relay station, the current traffic channel and the shared traffic channel can be carried either by the same carrier or by two separate carriers (each current transmit/receive device is associated with a different carrier).

Similarly, in the target relay station, the target traffic channel and the shared traffic channel can be carried either by the same carrier or by two separate carriers.

In some cases, the target relay station is in fact the current relay station (for example, if the current relay station is the "least worst" in terms of reception quality). In this case, no call handover between relay stations is done.

The first handover phase is advantageously preceded by a step in which the system and/or the mobile station detects deterioration in the quality of the call according to a predetermined detection criterion.

The invention does not impose any constraint as to the detection criterion used. One example is the receive power falling below a predetermined threshold.

The digital cellular mobile radio system is preferably of the time-division multiple access type.

Clearly, however, the principle of the invention, which is based on introducing a shared traffic channel, can be applied to other types of mobile radio system, for example (but not exclusively) frequency-division multiple access (FDMA) or code-division multiple access (CDMA) systems.

All the relay stations of said cell are preferably synchronous at frame level and the shared traffic channel is defined with identical features in all the relay stations.

In other words, the resources corresponding to a shared channel are used and defined identically by all the relay stations.

Reservation of the shared traffic channel for handover is advantageously of the strict reservation type or the partial reservation type, using a predetermined priority management strategy.

In the strict reservation case (i.e. for handover only), it is advantageous for each relay station to include at least two transmit/receive devices to increase the number of traffic channels available and thereby to limit the handicap represented by strict reservation of traffic channels.

Partial reservation of a shared channel means that the shared channel is sometimes used also as a "normal" channel (i.e. one that is not shared and is dedicated to a given mobile station, for example). Managing the priority of use of any such shared channel entails providing a higher priority level for use as a handover channel than for use as a normal (traffic or signaling) channel, for example.

Handover is preferably asynchronous or synchronous.

In asynchronous handover, the mobile station needs timing advance information (to use the GSM terminology) so that it can synchronize to and communicate with the target relay station. The timing advance information is transmitted to the mobile station with the PHYSICAL-INFO response message.

In synchronous handover, the clocks of the various relay stations are, by hypothesis, synchronous. Accordingly, when a mobile station is handed over from one relay station to another, it is not necessary to provide it with new timing advance information, because the timing advance can be deduced immediately from that previously being used.

The first handover phase is advantageously followed by the system sending the current relay station a message telling it to release the at least one current traffic channel.

This optimizes re-use of the current relay station channels.

The second handover phase is advantageously followed by the system sending the plurality of relay stations a message telling them to release the at least one shared traffic channel.

In this way, in the case of strict reservation, the shared traffic channel is available for handing over other mobile stations. In the case of partial reservation, the shared traffic channel is left free for another mobile station, or possibly the same mobile station, to use it as a "normal" traffic channel.

The at least one parameter related to the reception quality of the at least one test message and on which the predetermined section criterion is based is preferably the receive power, the signal to noise ratio, the raw bit error rate or the error rate after decoding.

Clearly the above list is not limiting on the invention. Also, the selection can be performed in accordance with more than one of the above parameters. Finally, it is feasible to combine a number of parameters each weighted by a weighting coefficient (which can itself be predetermined in accordance with another parameter).

The cell advantageously corresponds to indoor and/or outdoor coverage.

Indoor coverage corresponds to coverage inside a building, for example. Outdoor coverage corresponds to a predetermined area around the building, for example.

Other features and advantages of the invention will become apparent on reading the following description of one preferred embodiment of the invention given by way of illustrative and non-limiting example only and with reference to the accompanying drawings.

BRIEF DESCRIPTION OF THE DRAWINGS

FIG. 1 is a simplified block diagram of one particular embodiment of a system in which the handover method of the invention can be implemented.

FIG. 2 is a simplified flowchart of one particular embodiment of the handover method of the invention.

FIG. 4 is a simplified block diagram used to explain the double handover mechanism of the invention.

DETAILED DESCRIPTION OF THE PREFERRED EMBODIMENTS

Figure 3A:
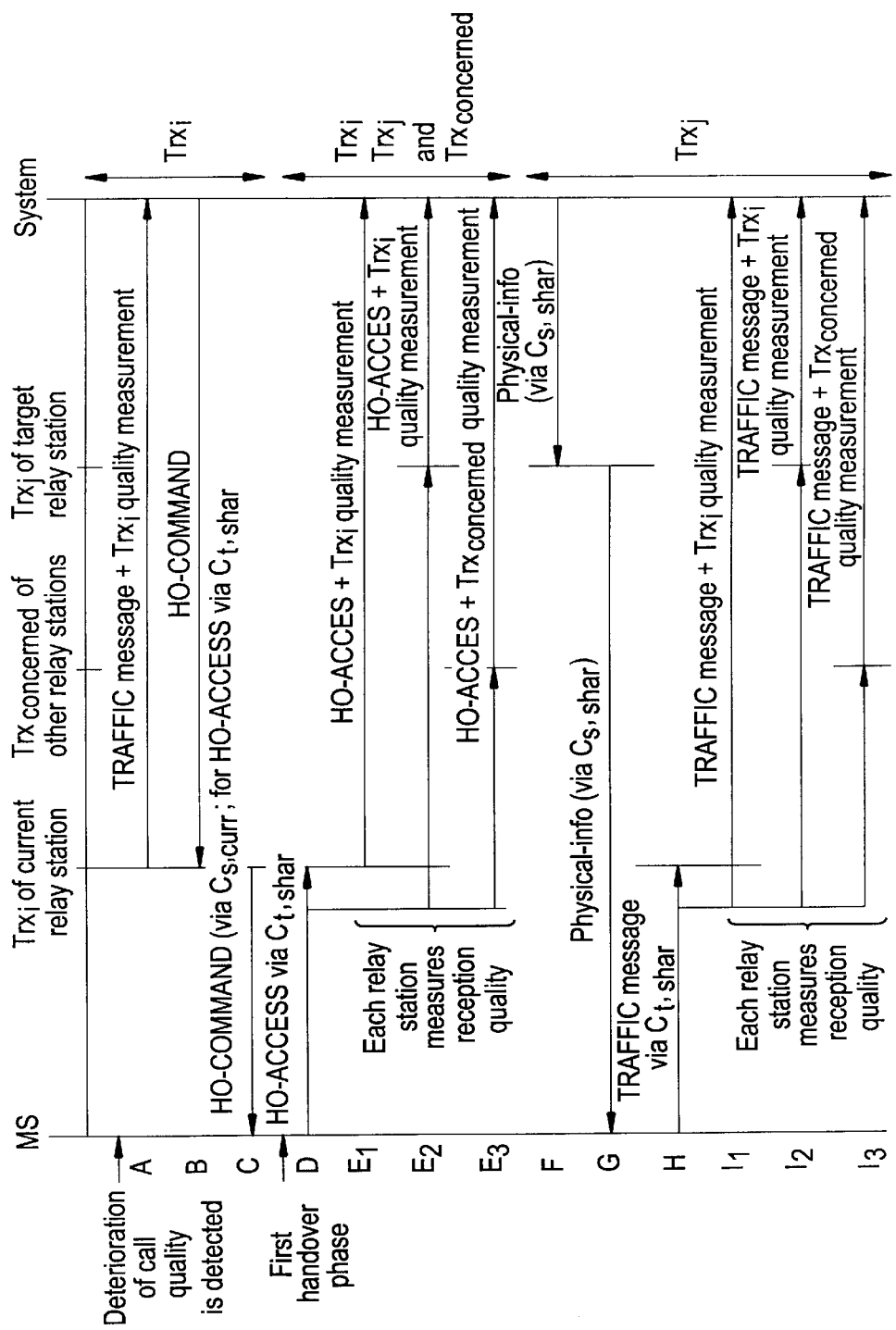
FIGS. 3A and 3B is a simplified timing diagram used to explain one particular embodiment of the handover method of the invention.

The remainder of the description concerns a time-division multiple access (TDMA) GSM mobile radio system. It is nevertheless clear that the invention applies to any digital cellular mobile radio system.

However, the invention can also apply to other communication techniques, in particular, although not exclusively, frequency-division multiple access (FDMA) or code-division multiple access (CDMA).

FIG. 1 shows a GSM mobile radio system in which the method in accordance with the invention can be used for handing over calls between a current relay station and a target relay station.

The explanation considers a cell 11 covering a building 101 with three corridors 18, 19 and 110. The cell 11 is associated with a distributed base transceiver station including a concentration center 16 and three relay stations 12 through 14, one in each corridor.

In the conventional way, each of the relay stations 12, 13, 14 includes an antenna $12_1$, $13_1$, and $14_1$, possibly a first transmit/receive device $12_2$, $13_2$, $14_2$ associated with the signaling carrier of the cell (all the relay stations of the cell transmit the same signaling carrier), and at least one second transmit/receive device $12_3$, $13_3$, $14_3$, each transmit/receive device being associated with a separate uplink or downlink traffic carrier. Each relay station 12, 13, 14 therefore uses one or more traffic carriers carrying a plurality of traffic channels TCH and a plurality of signaling channels associated with the traffic channels TCH.

In one variant, the signaling carrier BCCH (which is unique to the cell) is transmitted by only some relay stations, or even by none of them if the base transceiver station includes means separate from the relay stations dedicated to this transmission alone.

The base transceiver station uses a slow (i.e. frame by frame) frequency hopping technique, and so the frequency re-use factor is equal to 1. Accordingly, it remains only to plan the single frequency (or carrier) carrying the signaling. Coverage and/or call density are therefore considerably improved.

The relay stations 12, 13, 14 are separated by a distance in the range from 100 m to 200 m, for example. The transit time of a message between the mobile station 111 and its current relay station 14 can therefore be ignored. For explanatory purposes, it is assumed that a mobile station 111 moves and enters one of the corridors (for example corridor 19) at position 112. In this example it is therefore necessary to handover the call between the current relay station 14 and a target relay station 12.

For a call that has been set up, the mobile radio system allocates to the mobile station 111, from the channels of the current relay station 14 and those of the target relay station, at least one current traffic channel and at least one current associated signaling channel.

The relay stations 12, 13, 14 are synchronous at frame level and each channel of each relay station 12, 13, 14 is defined with a particular set of features (frequency hopping law, TSC, SFN, etc).

All the relay stations 12, 13, 14 of the cell 11 are connected to the relay station concentration center 16 via the Abis interface 15. This interface serves as an intermediary in communications between the relay stations 12 through 14 and the base station controller (BSC) 17 that controls a plurality of base stations of the GSM mobile radio system. In one variant the concentration functions are handled by the BSC directly and the distributed base transceiver station does not have any concentration center as an independent physical entity.

In accordance with an essential feature of the invention, the relay stations 12 through 14 of the cell share at least one traffic channel, called the shared traffic channel, and possibly at least one signaling channel associated with the shared traffic channel, called the shared associated signaling channel. The shared channels are reserved for call handover, as explained in detail hereinafter.

The shared traffic channel, and possibly the shared associated signaling channel, are each defined with identical features in all of the relay stations 12 through 14. The identical features include the frequency hopping law, TSC, SFN, etc.

The shared associated signaling channel can correspond to at least one slow associated control channel (SACCH) and/or at least one fast associated control channel (FACCH).

Reservation of the shared channels for handover can be either strict or partial. In the former case, the shared channels are allocated to call handover only whereas in the second case they can be allocated to other functions (in particular traffic and/or signaling). In the former case it is advantageous for the relay station 14 to include one or more additional transmit/receive device(s) $14_4$ to increase the number of traffic channels available and thereby reduce the risk of blocking.

Note that even though reservation of the shared traffic channel concerns all the relay stations, it is nevertheless possible to activate only some of the relay stations when implementing this double handover mechanism in accordance with the invention (as explained in detail hereinafter). In this case, the best relay station is selected from only the activated relay stations For example, only the relay stations nearest the current relay stations are activated (i.e. only the relay stations likely to be targets in handover).

A first particular embodiment of the method in accordance with the invention of handing over calls between two relay stations is described next with reference to the FIG. 2 flowchart.

As previously indicated, for explanatory purposes it is assumed that the aim is to transfer a call for mobile station 111 from the current relay station 14 to the target relay station 12.

The method of the invention includes the following successive steps:

The system detects (step 21) deterioration of call quality, in accordance with a predetermined detection criterion.

In one variant, the deterioration is detected by the mobile station. In another variant it is detected by the mobile station and the system. The predetermined detection criterion corresponds to the comparison of the receive quality measured value with a required minimum threshold, for example, and observation that the measured value is below the minimum threshold.

The system performs a first handover phase 22, with the shared traffic channel as the first target traffic channel. This first phase 22 constitutes the first step of the double handover mechanism of the invention. The (final) target traffic channel has not been determined yet at this stage of the process. In the case of partial reservation, the shared channel(s) reserved for handover must be "reserved" after detecting deterioration of call quality. The first handover phase 22 includes the following successive steps:

The mobile station sends one or more test messages to the plurality of relay stations and each relay station measures the quality of reception of the test messages (step 221). The test message(s) can include at least one specific message such as the "Handover-Access" message, and possibly one or more traffic messages.

The system selects the target relay station from the plurality of relay stations in accordance with at least one predetermined selection criterion based on at least one parameter associated with the quality of reception of the test message(s) (step 222). The selected target relay station is advantageously that enabling best communication with the mobile station to which the current handover relates. In the worst case scenario, the current relay station may remain the "least worst" relay station for receiving messages from the mobile station, despite the deterioration in call quality.

The system performs a second handover phase using a traffic channel associated with the target relay station as the second target traffic channel (step 23).

In one variant, the first handover phase 22 can be followed immediately by a step of releasing the current channels (current traffic channel and current associated signaling channel(s)) used by the current relay station.

In one variant, the second handover phase 25 can be immediately followed by a step of releasing the shared channel (shared traffic channel and shared associated signaling channel(s)) used by the current relay station. This is beneficial in particular if it is possible to use the shared channels as "normal" (traffic and associated signaling) channels, for example in the context of partial reservation of these shared channels.

Figure 3B:
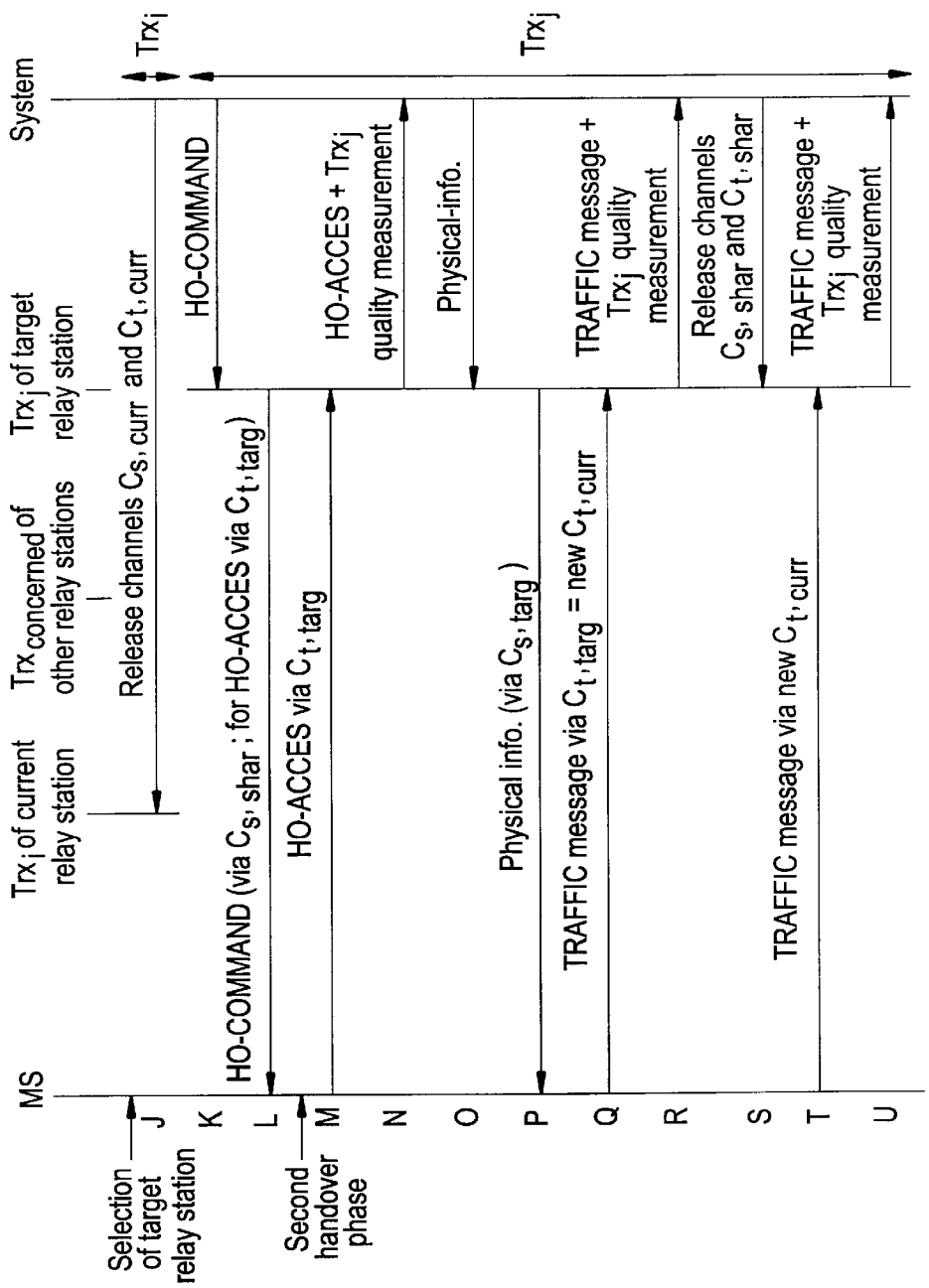

One particular embodiment of the handover method of the invention is described next with reference to the FIGS. 3A and 3B timing diagram.

The following description concerns asynchronous handover.

It is nevertheless clear that the invention applies equally to synchronous handover, and the skilled person will know how to switch easily from one to the other, without departing from the scope of the present invention.

The fact that handover is asynchronous means in particular that the timing advance relating on the one hand to the relay stations 13, 14 that may be target stations and on the other hand to the target relay station 12 must be supplied to the mobile station.

For simplicity, it is assumed in the remainder of the description that the transmit/receive device $TRX_i$ of the current relay station providing the current traffic channel and the current associated signaling channel is also that providing the shared traffic channel and the shared associated signaling channel. It is also assumed that the transmit/receive device $TRX_t$ of the target relay station providing the shared traffic channel and the shared associated signaling channel is also that providing the target traffic channel and the target associated signaling channel (see FIG. 4).

Clearly, however, different transmit/receive devices can be used in the current relay station and in the target relay station to support the aforementioned channel.

Steps A through U are described successively hereinafter.

In step A, the transmit/receive device $TRX_i$ of the current relay station transmits to the system, via the Abis interface, a measured value of the quality of reception of a traffic message on the current traffic channel $C_{t,curr}$ by the transmit/receive device $TRX_i$. The measured value can be transmitted with the traffic message (transmitted originally by the mobile station MS) whose quality of reception it indicates.

In one variant, the mobile station MS measures the quality of reception of a traffic message sent by the current relay station. The result of that measurement is then transmitted to the system from the mobile station and via the current relay station.

After step A, it is assumed that the system detects deterioration in the quality of reception of the message sent by the mobile station MS. This detection constitutes step 21 (FIG. 2).

The subsequent steps B through G constitute the first handover phase 22 of FIG. 2 of the double handover mechanism of the invention.

In step B, the system transmits to the current relay station, via the Abis interface, a first handover request message HO-COMMAND ("Handover-Command").

In step C, the transmit/receive device $TRX_i$ of the current relay station sends a first handover request message ("Handover-Command") to the mobile station via at least one current associated signaling channel $C_{s,curr}$. The signaling channel is the FACCH, for example. By means of parameters specific to it, the message invites the mobile station MS to send at least a first "Handover-Access" test message, which is to be measured by all the relay stations, via the shared traffic channel $C_{t,shar}$.

In step C communication between the mobile station MS and the current relay station is via the current channels (current traffic channel $C_{t,curr}$ ( and current associated signaling channel $C_{s,curr}$) via the transmit/receive device $TRX_i$ of the current relay station.

The subsequent steps D through $E_3$ constitute step 221 from FIG. 2.

In step D, the mobile station MS sends a first "Handover-Access" test message to all the relay stations via the shared traffic channel $C_{t,shar}$. The shared traffic channel constitutes the first target channel of the double handover mechanism of the invention. All the relay stations of the cell then listen to the "Handover-Access" test message- The first test message may be followed by at least one second test message.

In steps $E_1$, $E_2$ and $E_3$, which are executed simultaneously, each relay station transmits via the Abis interface a measured value of the quality of reception of the first test message or the test message(s) (or quality information) on the shared traffic channel $C_{t,shar}$. The measurement (or each measurement) may be accompanied by the first test message or the associated test message (i.e. the one on which the measurement was done).

In step F, the system transmits a first "PHYSICAL-INFO" response message via the Abis interface to the transmit/ receive device $TRX_i$ of the target relay station. The response message is intended in particular to indicate the information the mobile station needs to synchronize to the target relay station (power, timing advance, etc). The shared associated signaling channel $C_{s,shar}$ is a slow associated control channel (SACCH) or a fast associated control channel (FACCH), for example.

In step G the transmit/receive device $TRX_i$ of the target relay station transmits the first response message to the mobile station. To this end the first response message is transmitted via the shared associated signaling channel $C_{s,shar}$. The first response message is accompanied by the aforementioned synchronization information, in particular the timing advance (TA).

In step H, the mobile station continues to communicate by sending at least one "TRAFFIC MESSAGE" via the shared traffic channel $C_{t,shar}$ to the target relay station. Note that it is nevertheless beneficial to limit the number of traffic messages that can use the shared traffic channel $C_{t,shar}$. Other mobile stations must also be able to use it for their own handovers.

In steps D through H communication between the mobile station MS and the relay station(s) involved is via the shared channels (shared traffic channel $C_{t,shar}$ and shared associated signaling channel $C_{s,shar}$) via the transmit/receive device TRX concerned of each relay station concerned.

In steps $I_1$, $I_2$ and $I_3$, which are executed simultaneously, each target relay station transmits a measured value of the quality of reception of the traffic message (or quality information) that it has performed on the shared traffic channel $C_{t,shar}$ via the Abis interface. Each of the measured values can be accompanied by the corresponding traffic message. Because the shared traffic channel enables the system to communicate with the mobile station, the shared traffic channel may be regarded as a "real" traffic channel vis-à-vis the mobile station and/or the system reserved for the call.

The system receives and analyzes the various measured values from the various relay stations (current relay station, target relay station to be determined and other relay stations). It then selects the target relay station according to a selection criterion. This selection constitutes step 222 of FIG. 2, which does not appear as such in FIGS. 3A and 3B currently being described. The selection criterion is based on the best value of the receive level measured by all the relay stations that have carried out the quality measurements, for example. Clearly, however, the selection criterion can be based on other parameters, also associated with the quality of reception of the test message(s), for example the signal to noise ratio, the raw bit error rate, the bit error rate after decoding, etc.

In one variant, the selection can be performed between steps $E_3$ and F. However, it is clearly preferable to perform one or more quality measurements on one or more traffic messages, serving as test messages, for more reliable selection of the target relay station.

In step J the system transmits to the current relay station, via the Abis interface, a first "RELEASE" message telling it to release the current channels (current traffic channel $C_{t,curr}$ and the associated signaling channel $C_{s,curr}$).

In one variant this first message to release the current channels is transmitted immediately after step C of transmitting the first handover message "HO-COMMAND".

The subsequent steps K through P constitute the second handover phase 23 from FIG. 2 of the double handover mechanism of the invention.

In step K, the system transmits to the target relay station, via the Abis interface, a second handover request message HO-COMMAND. In step B, a first handover request message HO-COMMAND was transmitted by the system to the current relay station to initiate the first handover phase of the double handover mechanism of the invention.

In step L, the target relay station transmits the second handover request message "HO-COMMAND" to the mobile station MS via at least one shared associated signaling channel $C_{s,shar}$. The message invites the mobile station MS to send a second test message "HO-ACCESS" via the target traffic channel $C_{t,targ}$. The target traffic channel constitutes the second target traffic channel of the double handover mechanism of the invention. To this end, transmission of the second handover request message between the target relay station and the mobile station is performed on the FACCH, serving as the shared associated signaling channel $C_{s,shar}$.

In step M, the mobile station MS sends a second test message "HO-ACCESS" to the target relay station via the target traffic channel $C_{t,targ}$. In step D, the mobile station MS sent a first test message "HO-ACCESS" to the current relay station via the current traffic channel $C_{t,curr}$.

In step N, the target relay station transmits the measured value of the quality of reception of the second test message (or quality information) via the Abis interface. This message may be accompanied by the corresponding second test message (on which the measurement was carried out).

In step O, the system transmits a second response message "PHYSICAL-INFO" to the target relay station via the Abis interface. In step F, the system transmitted a first response message "PHYSICAL-INFO" to the target relay station via the Abis interface. The second response message is also intended to indicate the information the mobile station needs to synchronize to the target relay station (power, timing advance, etc). To this end, the target associated signaling channel $C_{s,targ}$ is an SACCH (or FACCH), for example.

In step P, the transmit/receive device $TRX_i$ of the target relay station transmits the second response message to the mobile station via the target associated signaling channel $C_{s,targ}$, accompanied by synchronization information, in particular the timing advance (TA).

In step Q, the second handover phase terminates and the mobile station communicates with the target relay station via the target traffic channel $C_{t,targ}$. It therefore continues its call by sending traffic messages ("TRAFFIC MESSAGE") via the new current traffic channel $C_{t,current}$ and the new current relay station. The target traffic channel and the target relay station have respectively become the new current traffic channel and the new current relay station.

In step R, the new current relay station forwards a measured value of the quality of reception of the traffic message to the system via the Abis interface. This measured value can be transmitted with the associated traffic message.

From step Q onward, communication between the mobile station MS and the new current relay station is via the new current channels, i.e. the target channels (target traffic channel $C_{t,targ}$ and target associated signaling channel $C_{s,targ}$) via the transmit/receive device $TRX_i$ of the new current relay station, i.e. the target relay station.

In step S, the system transmits a second "RELEASE" message to the current transmit/receive device $TRX_i$ of the current relay station, via the Abis interface, telling it to release the shared channels (shared traffic channel $C_{t,shar}$ and shared associated signaling channel $C_{s,shar}$). The aim is, in particular, to make them available for other handovers associated with other mobile stations in the case of strict reservation or to leave them free for use as normal traffic and signaling channels in the case of partial reservation.

In one variant, the second message to release the shared channels is transmitted immediately after step L of transmitting the first handover message "HO-COMMAND".

In another variant, release of the current channels (current traffic channel $C_{t,curr}$ and associated current signaling channel $C_{s,curr}$) simultaneously with step S can be considered. In this case, the first release message is sent in step S, not in step J.

Management of collisions between the various messages sent on the shared channels (shared traffic channel(s) $C_{t,shar}$ and shared associated signaling channel(s) $C_{s,shar}$) can optionally be provided.

In step T, the mobile station continues to communicate by sending at least one "TRAFFIC MESSAGE" to the new current relay station via the new current traffic channel $C_{t,current}$.

In step U, the new current relay station transmits the measured value of the quality of reception of the preceding traffic message (performed by the new current relay station) via the Abis interface. As for step A, the measured value can be accompanied by the corresponding traffic message.

Communication between the system and the mobile station can thereafter be subject to at least one other double handover mechanism in accordance with the invention.

Clearly, if the current relay station is the "least worst" relay station of the cell in terms of the measured quality of reception, the target relay station and the current relay station are one and the same. However, in this case, the target transmit/receive device can be identical (so that there is no handover) or different (so that there is handover) from the current transmit/receive device.

The double handover mechanism of the invention is described again with reference to the FIG. 4 diagram.

Depending on the context of the invention (distributed base transceiver station with geographically distributed relay stations), each transmit/receive device $TRX_i$ (for the current relay station), $TRX_{concerned}$ (for each of the other relay stations) and $TRX_j$ (for the target relay station) is associated with a respective different carrier 41, 42, 43. Each carrier is structured in frames each divided into a particular number of time slots (conventionally eight time slots). Each traffic channel TCH No. 1 through TCH No. 7 of a given carrier is carried by a separate time slot.

In the example the mobile station communicates initially with the transmit/receive device $TRX_i$ of the current relay station via the current traffic channel TCH No. 1 and the current associated signaling channel(s).

It is then assumed that, following detection of deterioration in the quality of reception by the current relay station of a traffic message from the mobile station, handover to a target relay station yet to be determined is initiated.

The method in accordance with the invention for handover between relay stations therefore consists in performing, in succession, a first handover from the current traffic channel ($C_{t,curr}$) to the shared traffic channel ($C_{t,shar}$), serving as the first target traffic channel (in other words, there is a change from the current transmit/receive device of the current relay station to the transmit/receive device concerned (i.e. carrying the shared channel(s) of each relay station)) and a second handover from the shared traffic channel ($C_{t,shar}$) to the target traffic channel ($C_{t,targ}$), serving as the second target traffic channel (in other words, there is a change from the transmit/receive device concerned of each relay station to the target transmit/receive device of the target relay station).

There is claimed:

1. A method of handing over calls between two relay stations, respectively a current relay station and a target relay station, in the same cell of a digital cellular mobile radio system, said cell being associated with a base transceiver station comprising plurality of relay stations, including said current and target relay stations, geographically distributed within said cell, each relay station comprising at least one antenna connected to at least one transmit/receive device, each relay station having a plurality of traffic channels and a plurality of associated signaling channels, said call being set up for a mobile station and being allocated, from the channels of said current relay station, at least one current traffic channel and at least one current associated signaling channel, wherein said plurality of relay stations shares at least one particular traffic channel, namely a shared traffic channel, which is reserved at least partly for handover, and wherein said method includes the following successive steps: a first handover phase in which said shared traffic channel is a first target traffic channel and a second handover phase with a traffic channel associated with said target relay station as a second target traffic channel, said first phase including the following successive steps: sending by said mobile station of at least one test message to said plurality of relay stations via said shared traffic channel, and selection by said system of said target relay station from said plurality of relay stations, in accordance with at least one predetermined selection criterion based on at least one parameter associated with the quality of reception of said at least one test message.

2. The method claimed in claim 1 wherein said first handover phase is preceded by said system and/or said mobile station detecting deterioration in the quality of said call according to a predetermined detection criterion.

3. The method claimed in claim 1 wherein said digital cellular mobile radio system is of the time-division multiple access type.

4. The method claimed in claim 3 wherein all said relay stations of said cell are synchronous at frame level and said shared traffic channel is defined with identical features in all said relay stations.

5. The method claimed in claim 1 wherein reservation of said shared traffic channel for handover is strict reservation or partial reservation, using a predetermined priority management strategy.

6. The method claimed in claim 1 wherein said handover is asynchronous or synchronous.

7. The method claimed in claim 1 wherein said first handover phase is followed by said system sending said current relay station a message telling it to release at least one current traffic channel.

8. The method claimed in claim 1 wherein said second handover phase is followed by said system sending said plurality of relay stations a message telling them to release said at least one shared traffic channel.

9. The method claimed in claim 1 wherein said at least one parameter associated with the quality of reception of said at least one test message and on which said predetermined selection criterion is based is the receive power, the signal to noise ratio, the raw bit error rate or the bit error rate after decoding.

10. The method claimed in claim 1 wherein said cell corresponds to an indoor and/or outdoor coverage.

* * * * *